July 29, 1952   L. H. SARLLS   2,605,020
SEED PLANTER ATTACHMENT
Filed April 18, 1947
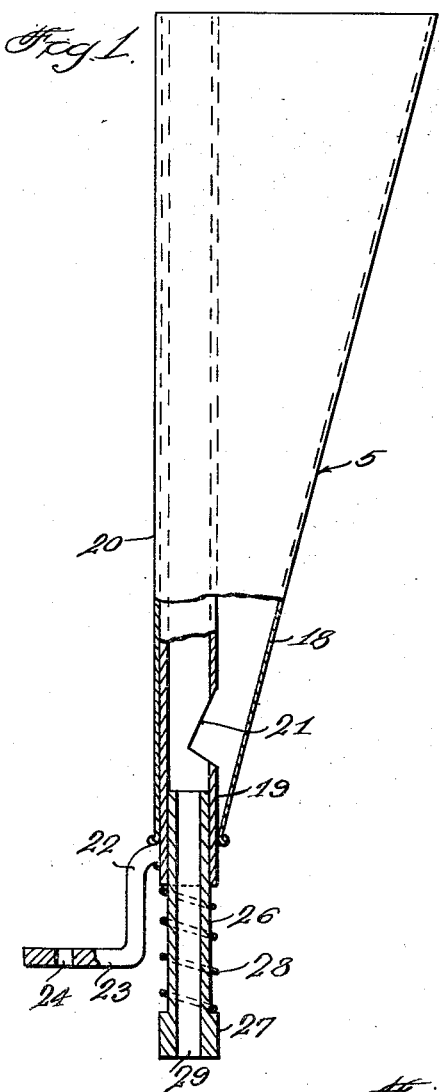
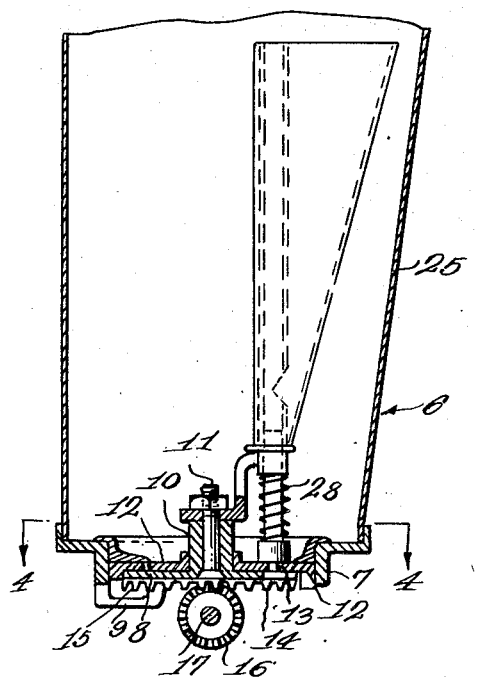
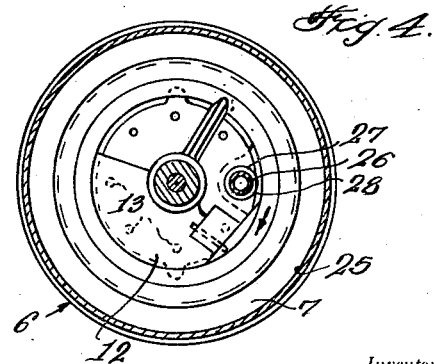
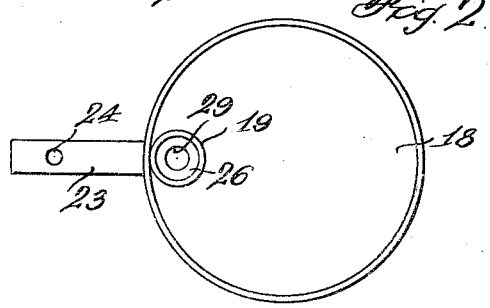
Inventor
Lawrence H. Sarlls
By Randolph & Beavers
Attorneys Patented July 29, 1952

2,605,020

UNITED STATES PATENT OFFICE 2,605,020

SEED PLANTER ATTACHMENT

Lawrence H. Sarlis, Victoria, Tex.

Application April 18, 1947, Serial No. 742,400

6 Claims. (Cl. 222—129)

This invention relates to an attachment for use with conventional seed planters, particularly cotton and corn planters, and for adapting such planters for use in planting small seeds, such as turnips, onions, clover and grass seeds.

The conventional type cotton and corn planter is incapable of efficient use for planting small seeds due to the fact that such seeds will pass around the plate and into and through the moving parts of the planter causing a considerable waste of the seeds and since such seed is ordinarily quite expensive, this waste assumes such proportions that it is impossible to use conventional planters for this purpose.

Accordingly, it is a primary object of the present invention to provide an attachment of extremely simple construction capable of being quickly and easily applied to or removed from a conventional corn or cotton planter and which is contained within the hopper thereof and by means of which the small seeds can be fed accurately to the hole or holes of the planter plate of the planter and discharged therefrom in a conventional manner to the seed spout without loss or waste of the seed and without danger of any of the seeds passing around the planter plate and into the gears and other planter mechanism.

Various other objects and advantages of the invention will hereinafter become more fully apparent from the following description of the drawing, illustrating a preferred embodiment thereof, and wherein:

Figure 1 is a side elevational view, partly broken away and partly in vertical section illustrating the planter attachment in a preferred form thereof;

Figure 2 is a top plan view of the planter attachment;

Figure 3 is a side elevational view thereof, on a reduced scale and showing the attachment in an applied position on a cotton or corn planter, partially illustrated in vertical section, and Figure 4 is a horizontal sectional view taken substantially along a plane as indicated by the line 4—4 of Figure 3.

Referring more specifically to the drawing, for the purpose of illustrating a preferred adaptation and use of the seed planter attachment, designated generally 5 and comprising the invention, a portion of the conventional corn or cotton planter is illustrated in Figures 3 and 4 and designated generally 6, and includes a frame or base 7 containing a fixed planter plate 8 which is disposed substantially concentric therewithin and supported relatively thereto by a plurality of downwardly offset connecting brackets or arms 9, one of which is shown in Figure 3. The fixed plate 8 is provided with a central column or stem 10 which rises therefrom and which has a bore extending longitudinally therethrough for receiving the bolt of a nut and bolt fastening 11. An annular planter plate 12 is supported on the fixed plate 8 and rotatably disposed within the frame or base 7 and is provided with a central flanged opening which rotatably fits about the stem or collar 10. The planter plate 12 is provided with circumferentially spaced seed receiving apertures 13 and the fixed planter plate 8 is provided with a recessed portion 14 with which each of said apertures 13 register during a portion of each revolution thereof, all in a conventional manner. The rotatable planter plate 12 is provided with a depending annular gear 15 adjacent the periphery thereof the teeth of which meshes with a gear or pinion 16 on a driven shaft 17 of the planter 6 and by means of which said rotatable planter plate 12 is driven relatively to the fixed plate 8. The parts 6 to 17, inclusive, form no part of the present invention, but merely constitute conventional parts of a corn or cotton planter and have been shown and described merely to better illustrate the application and function of the seed planter attachment 5, constituting the invention.

The seed planter 5 includes an elongated hopper 18 having a relatively large open upper end and a restricted lower end which is closed by a tube or pipe 19 having a lower end portion which extends therethrough and which is secured thereto, in any suitable manner as by soldering or by welding. The hopper 18 has a substantially straight or vertical portion 20 in which the pipe 19 is disposed, internally of said hopper 18 and to which said pipe is secured in any desired manner. The upper portion of the tube or pipe 19 may terminate at or adjacent the enlarged open upper end of the hopper 18 and said tube 19 is provided with an inlet opening 21 on the side thereof, away from the hopper wall 20 and which opens into the hopper 18 adjacent the lower end thereof and through which, seed, not shown, from the hopper 18 is adapted to be discharged into the lower portion of the tube or pipe 19.

A bracket arm 22 is suitably secured at one end thereof to the tube or pipe 19 beneath and adjacent the lower end of the hopper 18 and is provided with a downwardly offset outwardly extending free end 23 which is disposed substantially at a right angle to the axis of the tube 19 and which is provided with an opening 24 to receive the shank end of the bolt of the fastening 11 and which is adapted to rest on the stem or collar 10 and be clamped thereto by the applying and tightening of the nut of the fastening 11 above said end 23, all as clearly illustrated in Figure 3, for demountably supporting the attachment 5 on the planter 6 and within the hopper 25 thereof.

A tube or pipe 26 has an upper end which telescopes into the lower end of the tube 19 and is provided with an externally enlarged lower end 27 forming an upwardly facing annular shoulder, engaged by the lower end of an expansion coil spring 28 which is mounted on the tube 26 and the upper end of which bears against the lower end of the tube 19 for yieldably urging said tube 26 outwardly of the tube 19. The bore 29 of the tube 26 is considerably smaller than the bore of the tube 19 and forms a passage for the seeds, as will hereinafter be described. When the planter attachment 5 is applied as shown in Figure 3 and as previously described, the spring 28 will yieldably retain the lower end of the tube 26 in flush engagement with a portion of the rotatable planter plate 12 and the bore 29 thereof will be disposed and positioned by the bracket 22 to register with the seed openings 13 as the plate 12 is revolved. The attachment 5 is supported at such an elevation that the spring 28 will retain the upper end of the tube 26 below the opening 21 of the tube 19 so that the seeds contained in the hopper 18 will flow therefrom through the opening 21 into tube 19 and by gravity into the bore 29 and from said bore into the seed openings 13 as said openings move into and out of registry with the lower end of the bore. The tube 26 is so disposed relatively to the plate 8 that after the openings 13 have moved out of registry with the bore 29 and have been filled with seed therefrom, that they will thereafter move into registry with the cut-out portion 14 of the fixed plate 8 so that the seed can be discharged from the openings 13 and conveyed in a conventional manner, not shown, to the seed spouts of the planter 6. The spring 28 will retain the lower end of the tube 26 in flush engagement with the upper side of the rotatable planter plate 12 to prevent escape of the seeds therebetween to avoid wastage of the seeds and to assure that all seed dispensed from the bore 29 will be contained in the seed openings 13.

Various modifications and changes are contemplated and may obviously be resorted to, without departing from the spirit or scope of the invention, as hereinafter defined by the appended claims.

I claim as my invention:

1. In an attachment for planting small seeds for use with conventional cotton and corn planters, said attachment comprising a hopper, a tube secured therein and extending through and closing the open lower end of said hopper and provided with a lateral opening adjacent its lower end communicating with the interior of the hopper for receiving seeds therefrom, a tubular extension having an upper end telescopically engaging in said tube below the lateral opening and a lower end depending therefrom, said tubular extension being provided with a restricted bore forming the outlet end of the discharge passage for the seed from the hopper, a bracket arm secured to a part of the attachment disposed above the tubular extension and adapted to be detachably secured to a fixed part of a corn or cotton planter and supporting the attachment therein and positioning said attachment with the lower end of the telescopic extension of said tube in engagement on a rotatable planter plate of said planter and with the bore of said telescopic extension disposed to register with the seed planting openings of the rotatable planter plate and into which the seed is conveyed by gravity.

2. A planter attachment as in claim 1, and spring means yieldably urging the telescopic extension downwardly relatively to the tube for retaining the lower end of said extension in flush engagement with the upper side of the rotatable planter plate and the upper end thereof below the lateral opening of the tube.

3. In combination with a conventional corn or cotton planter including a rotatable planter plate having circumferentially spaced seed receiving openings, a seed conduit formed of telescopic sections, a bracket secured to the upper section and adapted to be detachably secured to a fixedly disposed part of the planter for supporting the seed planting attachment therein and for positioning the conduit whereby the lower end of the other, lower section thereof will rest on the rotatable planter plate and with the bore thereof disposed to register with the seed receiving openings as the planter plate revolves therebeneath, and means for supplying small seeds to said conduit to be conveyed by gravity to the lower end thereof to be discharged into said seed openings.

4. An attachment as in claim 3, said means comprising a hopper secured to the upper, fixed section of said conduit and in which a portion of said upper section is disposed, and said portion being provided with an opening communicating with the hopper adjacent its lower end for receiving seeds therefrom.

5. An attachment as in claim 3, said lower conduit section having an enlargement adjacent its lower end, and an expansion coil spring carried by said lower section and bearing against said enlargement and against the adjacent end of the other conduit section for yieldably retaining the lower end of said lower section in flush engagement with the rotatable planter plate.

6. An attachment as in claim 3, said means comprising a hopper secured to the upper, fixed section of said conduit and in which a portion of said upper section is disposed, and said portion being provided with an opening communicating with the hopper adjacent its lower end for receiving seeds therefrom, said lower conduit section having an enlargement adjacent its lower end, and an expansion coil spring carried by said lower section and bearing against said enlargement and against the adjacent end of the other conduit section for yieldably retaining the lower end of said lower section in flush engagement with the rotatable planter plate.

LAWRENCE H. SARLLS.

REFERENCES CITED

The following references are of record in the file of this patent:

UNITED STATES PATENTS

| Number | Name | Date |
|---|---|---|
| 529,686 | Wehrman | Nov. 20, 1894 |
| 866,747 | Thomas et al. | Sept. 24, 1907 |
| 1,237,986 | Whitworth | Aug. 21, 1917 |
| 1,733,749 | Patterson | Oct. 29, 1929 |
| 2,061,955 | Waddick | Nov. 24, 1936 |
| 2,249,791 | Simon et al. | July 22, 1941 |
| 2,299,717 | Emmons et al. | Oct. 20, 1942 |
| 2,311,251 | Rees et al. | Feb. 16, 1943 |
| 2,417,700 | McCarty | Mar. 18, 1947 |
| 2,472,092 | Campbell | June 7, 1949 |